(12) United States Patent
Bhalerao et al.

(10) Patent No.: US 9,055,059 B1
(45) Date of Patent: Jun. 9, 2015

(54) COMBINING MULTIPLE DIGITAL CERTIFICATES

(71) Applicant: Symantec Corporation, Mountain View, CA (US)

(72) Inventors: Kokil Bhalerao, Sunnyvale, CA (US); Quentin Liu, San Jose, CA (US); Marc Williams, San Jose, CA (US); Richard F. Andrews, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/231,698

(22) Filed: Mar. 31, 2014

Related U.S. Application Data

(63) Continuation-in-part of application No. 13/750,828, filed on Jan. 25, 2013, which is a continuation of application No. 12/639,765, filed on Dec. 16, 2009, now Pat. No. 8,375,204.

(51) Int. Cl.
*H04L 9/32* (2006.01)
*H04L 29/06* (2006.01)

(52) U.S. Cl.
CPC .......... *H04L 63/0823* (2013.01); *H04L 9/3263* (2013.01); *H04L 9/3265* (2013.01); *H04L 9/3268* (2013.01)

(58) Field of Classification Search
CPC .......................... H04L 63/0823; H04L 9/3263
See application file for complete search history.

(56) References Cited

U.S. PATENT DOCUMENTS

| | | | |
|---|---|---|---|
| 6,085,320 A | 7/2000 | Kaliski, Jr. | |
| 6,978,364 B1 * | 12/2005 | Balaz et al. | 713/153 |
| 6,990,684 B2 * | 1/2006 | Futamura et al. | 726/18 |
| 7,131,003 B2 | 10/2006 | Lord et al. | |
| 7,409,553 B2 | 8/2008 | Kumagai et al. | |
| 7,774,599 B2 | 8/2010 | Guo et al. | |
| 8,135,950 B2 * | 3/2012 | Parkinson | 713/156 |
| 8,364,954 B2 | 1/2013 | Liu et al. | |
| 8,375,204 B2 | 2/2013 | Liu et al. | |
| 8,380,981 B2 * | 2/2013 | Beckwith et al. | 713/156 |
| 2002/0108042 A1 | 8/2002 | Oka et al. | |

(Continued)

FOREIGN PATENT DOCUMENTS

JP    2008042753 A    2/2008

OTHER PUBLICATIONS

Cooper et al. RFC 5280—"Internet X.509 Public Key Infrastructure Certificate and Certificate Revocation List (CRL) Profile" The IETF Trust (2008), retrieved from the Internet: <<http://www.iett.org/rfc/rfc5280.txt>>141 pages.

Helm and Mugaratham, "SubjectAltNames in X.509 Certificates," version 8, Aug. 2004, retrieved from the Internet: <<http://www.es.net/pub/esnet-doc/SubjectAltName.pdf>>, 6 pages.

(Continued)

*Primary Examiner* — Tae Kim
*Assistant Examiner* — Louis Teng
(74) *Attorney, Agent, or Firm* — Lowenstein Sandler LLP

(57) ABSTRACT

A method of combining digital certificates at a prescheduled time is provided. The method includes receiving, by a processor, data from a first certificate and data from a second certificate and determining a certificate combination date. The certificate combination date directs a combining of the first certificate and the second certificate to form a combined certificate. The method further includes detecting the occurrence of the certificate combination date and combining the first certificate and the second certificate to form the combined certificate in response to detecting the occurrence of the certificate combination date.

19 Claims, 8 Drawing Sheets

(56) References Cited

U.S. PATENT DOCUMENTS

| | | | |
|---|---|---|---|
| 2002/0147905 A1* | 10/2002 | Perlman | 713/157 |
| 2003/0126431 A1 | 7/2003 | Beattie et al. | |
| 2004/0177246 A1 | 9/2004 | Balaz et al. | |
| 2005/0114653 A1 | 5/2005 | Sudia | |
| 2005/0287990 A1 | 12/2005 | Mononen et al. | |
| 2006/0129804 A1 | 6/2006 | Satkunanathan et al. | |
| 2006/0265508 A1 | 11/2006 | Angel et al. | |
| 2007/0101125 A1 | 5/2007 | Lain et al. | |
| 2008/0209208 A1 | 8/2008 | Parkinson | |
| 2008/0228651 A1 | 9/2008 | Tapsell | |
| 2009/0092247 A1 | 4/2009 | Kido et al. | |
| 2009/0132812 A1 | 5/2009 | Kobozev et al. | |
| 2010/0048296 A1 | 2/2010 | Adiraju | |
| 2010/0185864 A1* | 7/2010 | Gerdes et al. | 713/175 |
| 2011/0145567 A1 | 6/2011 | Liu et al. | |
| 2011/0145569 A1 | 6/2011 | Liu et al. | |
| 2013/0138953 A1 | 5/2013 | Liu et al. | |
| 2013/0159702 A1* | 6/2013 | Peeters | 713/156 |

OTHER PUBLICATIONS

"Public key certificate"—Wikipedia Entry, retrieved from the Internet: <<http//en.wikipedia.org/wiki/Public_key_certificate>>, Feb. 2010 5 pages.

"Using Subject Altname," [Online Discussion Board], Oct. 2002, retrieved from the Internet: <<http://www.issociate.de/board/22008/Using_subjectAltName.html>>, 3 pages.

USPTO; Office Action for U.S. Appl. No. 12/639,765, mailed Jun. 8, 2012.

USPTO; Notice of Allowance for U.S. Appl. No. 12/639,765, mailed Oct. 5, 2012.

USPTO; Office Action for U.S. Appl. No. 13/750,828, mailed Nov. 20, 2014.

USPTO; Office Action for U.S. Appl. No. 12/639,771, mailed Jun. 21, 2012.

USPTO; Notice of Allowance for U.S. Appl. No. 12/639,771, mailed Sep. 26, 2012.

* cited by examiner

COMBINING MULTIPLE DIGITAL CERTIFICATES

CROSS-REFERENCES TO RELATED APPLICATIONS

This application is a continuation-in-part of U.S. patent application Ser. No. 13/750,828, filed Jan. 25, 2013), and entitled "Combining Multiple Digital Certificates", which is a continuation of U.S. patent application Ser. No. 12/639,765, filed Dec. 16, 2009, and entitled "Method and System to Combine Multiple Digital Certificates Using the Subject Alternative Name Extension," both of which are incorporated herein by reference in their entirety. U.S. Pat. No. 8,364,954, filed Dec. 16, 2009, and entitled "Method and System for Provisioning Multiple Digital Certificates," is also incorporated herein by reference.

BACKGROUND

X.509 certificates, also referred to as digital certificates, are used in a wide variety of applications. These digital certificates provide a method to verify the identity of a user, are a component of a secure communications channel, and deliver authentication information based on these capabilities.

X.509 certificates are defined by the Telecommunication Standardization Sector (ITU-T) of the International Telecommunication Union (ITU) as part of the Directory (X.500) series.

The structure of an X.509 v3 digital certificate is as follows:
Certificate
  Version
  Serial Number
  Algorithm ID
  Issuer
  Validity
    Not Before
    Not After
  Subject
  Subject Public Key Info
    Public Key Algorithm
    Subject Public Key
  Issuer Unique Identifier (Optional)
  Subject Unique Identifier (Optional)
  Extensions (Optional)
  . . .
Certificate Signature Algorithm
Certificate Signature X.509 certificates bind the name of an entity in the real world, such as a company "VeriSign," to a public key. The "Subject" field of the certificate provides a location for storage of the name, which is bound to the public key stored in the certificate. The subject name is in the form of an X.500 or LDAP directory name and is often identical to the entity's directory name, e.g., the fully qualified domain name of the website: www.verisign.com. Because of this close association, the X.509 certificate's Subject name is often referred to as the distinguished name. Many digital certificates contain only one name, which is stored in the Subject field.

Starting with X.509 v3 certificates, the subject alternative name extension was provided to allow identities to be bound to the subject of the certificate. These identities may be included in addition to or in place of the identity in the subject field of the certificate. Defined options include an Internet electronic mail address, a DNS name, an IP address, or a Uniform Resource Identifier (URI). Additional description related to the structure of X.509 digital certificates may be found in RFC 5280 from the IETF.

Despite the benefits available through the use of digital certificates, there is a need in the art for improved methods and systems related to the use of digital certificates.

SUMMARY

In one aspect, a method includes receiving, by a processor, data from a first certificate and data from a second certificate. The method further includes determining a certificate combination date, the certificate combination date directing a combining of the first certificate and the second certificate to form a combined certificate. The method further includes detecting the occurrence of the certificate combination date and combining the first certificate and the second certificate to form the combined certificate when the certificate combination date occurs.

Implementations may include any, all, or none of the following features. The data from the first certificate may include an expiration date of the first certificate and the data from the second certificate may include an expiration date of the second certificate. The certificate combination date may be an expiration date of the first certificate or an expiration date of the second certificate. The certificate combination date may be the expiration date of the first certificate when the expiration date of the first certificate is earlier than the expiration date of the second certificate. The data from the first certificate can include a first name from a Subject field or a SubjectAltName extension of the first certificate and the data from the second certificate can include a second name from a Subject field or a SubjectAltName extension of the second certificate. The combined certificate can include the first name and the second name in a SubjectAltName extension of the combined certificate.

In another aspect, a non-transitory machine-readable storage medium includes data that, when executed by a processor, cause the processor to perform operations includes displaying a user interface for combining at least a first certificate and a second certificate. The operations further include receiving the first certificate and the second certificate from a user of the user interface and receiving a certificate combination date from the user of the user interface. The operations further include forming, using a processor, a combined certificate from the first certificate and the second certificate on the certificate combination date received from the user. The operations also include transmitting the combined certificate to the user over a network.

In yet another aspect, a certificate combining system includes a memory to store certificate information including certificates and/or information extracted from certificates. The system further includes a processor, coupled to the memory, to provide a user interface to facilitate user input specifying at least the first certificate and the second certificate, and user input specifying a certificate combination date. The processor also forms a combined certificate from a first certificate and a second certificate on the certificate combination date.

DETAILED DESCRIPTION

Embodiments of the present invention relate to methods and systems for providing digital certificates with multiple names. In a first embodiment, a Certificate Authority (CA) can provide a combined certificate to purchasers as part of the initial certificate purchase process. The certificate purchase process is also referred to as a certificate enrollment process or a certificate provisioning process. In a second embodiment, several certificates are combined to form a combined certificate using a "Combine" feature that is offered to existing certificate holders. Other embodiments are also described herein.

According to embodiments of the present invention, the SubjectAltName extension provided by the certificate is used to store one or more names, for example, email addresses, additional domain names, or the like. As an example, the digital certificate containing www.verisign.com in the Subject field could also include additional website addresses such as www.thawte.com and www.geotrust.com in the SubjectAltName extension. The advantage of a digital certificate with multiple names (referred to herein as a combined certificate) is that the same certificate and associated private key can be used on physical web servers that serve any of the three names. Thus, the workload of a person administering the certificates is reduced by some embodiments of the present invention.

In a conventional certificate issuing system, certificate users purchase a certificate for each name. For the example given above, the user would purchase three certificates. As a result, the process of purchasing multiple certificates and managing these multiple certificates may be burdensome to the user. Embodiments of the present invention provide methods and systems that a CA can use to combine multiple certificates that have been provisioned to a single user. In one embodiment, the names in the Subject fields of the certificates (also referred to as the CommonName or common name field) will be used in the provisioning of the new combined certificate.

In other conventional certificate issuing systems, when a certificate user determines that changes will need to be made to one or more certificates in the future, for example upon an certificate expiration, the user may be required to wait until that future time to purchase a new certificate or forgo a portion of the money spent and renew the yet-to-expire certificate at a present time. Embodiments of the present invention provide methods and systems that allow a CA to schedule the combination of multiple certificates well in advance. In one embodiment, the user is provided with a user interface with an option to select the earliest expiration date of one of multiple certificates as a scheduled date on which the certificates will be combined.

Figure 1:
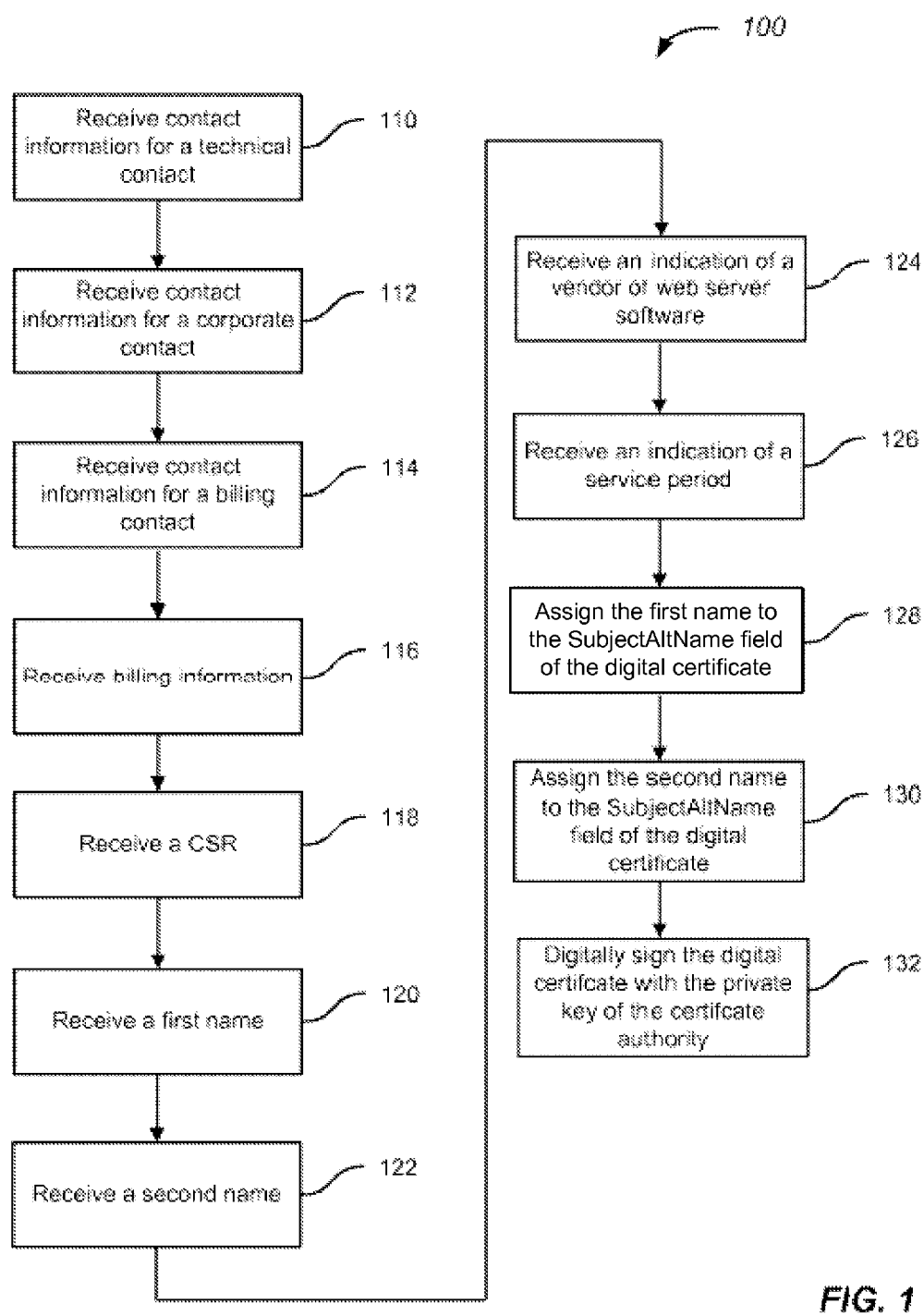
FIG. 1 is a simplified flowchart of a certificate enrollment process according to an embodiment of the present invention.

FIG. 1 is a simplified flowchart of a certificate enrollment process according to an embodiment of the present invention. In the certificate enrollment process illustrated in FIG. 1 (also referred to as a certificate provisioning process), a user provides multiple names that should be included in a single certificate. As part of the certificate enrollment process for the combined certificate, the user provides, and the CA receives, contact and billing information. Additionally, the CA receives a Certificate Signing Request (CSR) for the combined certificate.

In public key infrastructure systems, a CSR, also referred to as a certification request, is a message sent from an applicant to a CA in order to apply for a digital identity certificate. Before creating a CSR, the applicant first generates a public/private key pair, keeping the private key secret. The CSR contains information identifying the applicant, such as a website that can be used as the common name (CN) of the Subject field in an X.509 certificate. The distinguished name will typically include a common name plus other fields such as Organization, Organizational Unit, City, State, Country, and the like. The public key chosen by the applicant is included in the CSR and the private key is used to digitally sign the CSR.

According to embodiments of the present invention, the user will provide a first name, which will be stored in the common name portion of the Subject field and a second name, which will be stored in the SubjectAltName extension of the combined certificate. The combined certificate will be issued with a single public key used for both names. As explained more fully throughout the present specification, this concept is extendable to the storage of additional names in the SubjectAltName extension, for example, two names, three names, four names, or more names. Many other variations, modifications, and alternatives are also possible.

In a particular embodiment, the method of provisioning a certificate 100 includes receiving contact information for a technical contact associated with the digital certificate (110). The contact information can include the name of a technical contact person, a mailing address, one or more phone numbers, an email address, or the like. Contact information is also received for a corporate contact (112) and a billing contact (114). In some embodiments, a contact person may act in multiple roles, for example, as a corporate and billing contact point for the applicant. Billing information associated with the digital certificate is also received from the applicant (116). The billing information can include a method of payment and payment details for the purchase of the certificate. Other information related to payment for the certificate can also be provided. In other embodiments, less contact information is received and utilized in performing the methods described herein. Thus, the present invention is not limited to the particular contact information discussed in relation to FIG. 1.

A CSR for the digital certificate is received by the certificate provisioning system (118). In this embodiment, the CSR will include a name that will be used as the common name for the Subject field of the certificate, which can be referred to as a first name (120). A second name is also received (122) that will be used in forming the digital certificate. Additionally, the method includes receiving an indication of a vendor of web server software (124) and receiving an indication of a service period for the digital certificate (126). Examples of service periods are one year, two years, and the like.

The certificate provisioning system forms the digital certificate with both the first name stored or carried in the SubjectAltName extension of the digital certificate (128) and the second name stored or carried in the SubjectAltName extension of the digital certificate (130). In some embodiments, the first name or the second name may also be stored or carried in the Subject field of the digital certificate. The CA digitally signs the digital certificate with the private key of the CA (132). Thus, the applicant receives a completed digital certificate with one name, which may be referred to as a master name, stored in the Subject field of the certificate as the common name and one or more names stored in the SubjectAltName extension of the certificate.

According to an alternative embodiment, the method further includes receiving a third name for use in forming the digital certificate. The third name will be stored in the SubjectAltName extension of the digital certificate along with the second name. Thus, embodiments of the present invention provide certificates that can be used on more than two servers since more than two names (in this example, three names) can be stored in the certificate by using the Subject field and the SubjectAltName extension.

It should be appreciated that the specific operations illustrated in FIG. 1 provide a particular method of performing a certificate enrollment process according to an embodiment of the present invention. Other sequences of operations may also be performed according to alternative embodiments. For example, alternative embodiments of the present invention may perform the operations outlined above in a different order. Moreover, the individual operations illustrated in FIG. 1 may include multiple sub-steps that may be performed in various sequences as appropriate to the individual step. Furthermore, additional operations may be added or removed depending on the particular applications.

Figure 2:
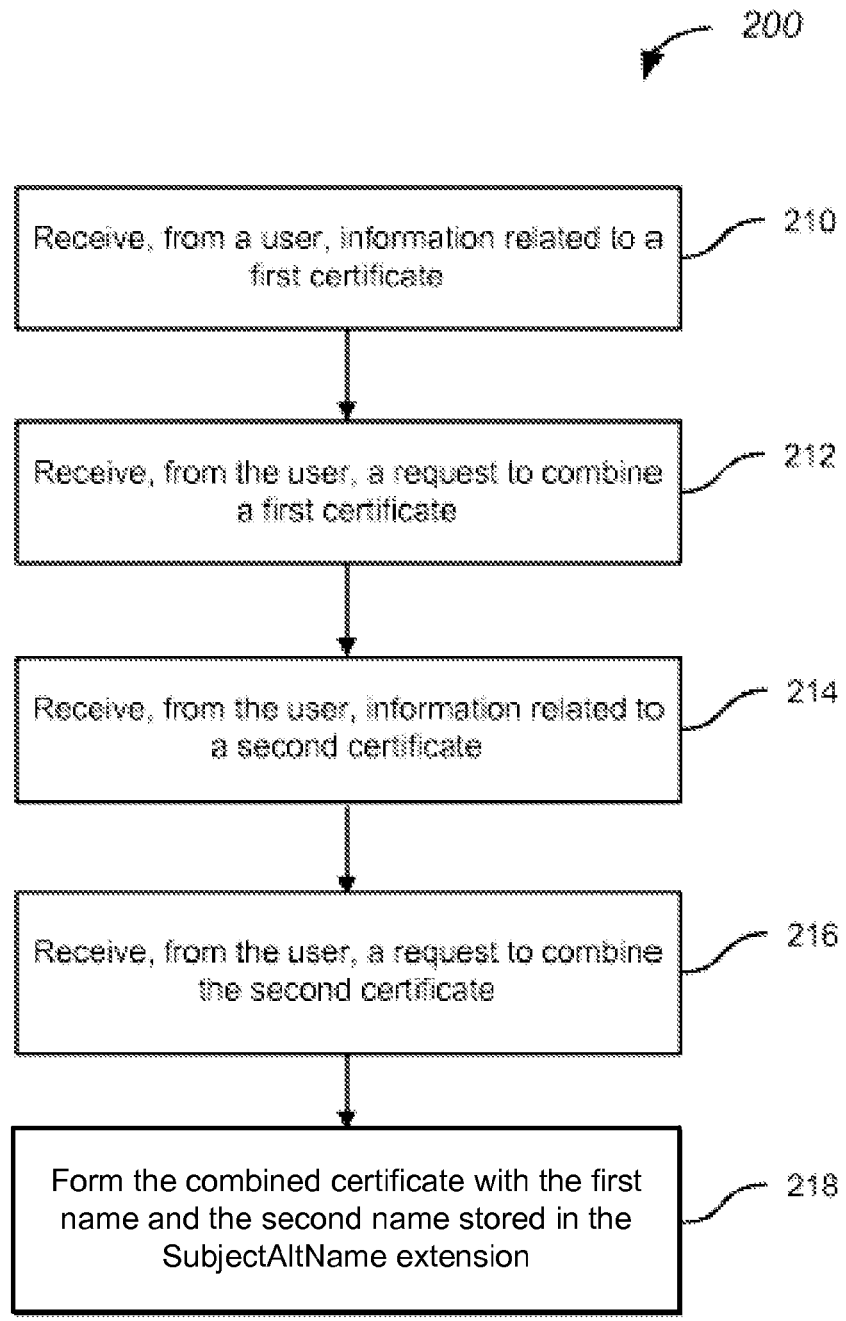
FIG. 2 is a simplified flowchart of a method of combining multiple digital certificates to form a combined digital certificate according to an embodiment of the present invention.

FIG. 2 is a simplified flowchart of a method of combining multiple digital certificates to form a combined digital certificate according to an embodiment of the present invention.

As illustrated in FIG. 2, a CA that has provisioned multiple certificates to a single user (where each certificate contains only one name) can offer a "Combine" feature to a user. The user can indicate multiple certificates that the user desires to combine into a single combined certificate. The user selects one of the certificates as the "master" certificate. The name stored in the Subject field of the master certificate will be stored in the Subject field of the combined certificate and the one or more names from the other certificates will be stored in the SubjectAltName extension of the combined certificate. The public key for the combined certificate will be extracted from the master certificate. Since the user has already been approved to possess certificates that include all the names, the CA can immediately issue the new combined certificate. The methods described herein are applicable to digital certificates complying with RFC 5280, for example, X.509 certificates.

The method 200 of combining a first digital certificate and a second digital certificate into a combined certificate includes receiving, from a user, information related to the first certificate (210). The first certificate has a Subject field including a first name (e.g., the common name of the subject field includes the domain name associated with a website). The user submits a request to combine the first certificate into the combined certificate (212). In an embodiment, a user interface is provided at the CA's website to enable an applicant to enter the information and requests discussed in relation to FIG. 2. The request to form the combined certificate using information related to the first certificate may be made prior to submission of the information. For example, a list of services could be offered to the user that includes the "Combine" feature. When a user selects the "Combine" feature, a new window could then be displayed that would provide a user interface to enter the information related to the first certificate. Many other variations, modifications, and alternatives are possible as well.

The method also includes receiving information from the user related to the second certificate (214). Typically, the second certificate has a Subject field including a second name. Similar to the first certificate, the second name can be a domain name associated with a website stored as the common name in the Subject field. Alternatively, the second name could be stored in the SubjectAltName extension of the second certificate. It should be noted that the first name could be stored in the SubjectAltName extension of the first certificate. The user submits a request to combine the second certificate into the combined certificate (216). In one embodiment, the requests to combine the first certificate and the second certificate can be performed as a single action when the user selects the "Combine" feature offered by the CA. Thus, although steps 212 and 216 are illustrated as separate steps in FIG. 2, they could be performed by the user taking a single action.

The CA forms the combined certificate (218). The first name is stored in the SubjectAltName extension, and may also be stored in the Subject field of the combined certificate. The second name is also stored in the SubjectAltName extension of the combined certificate. In an alternative embodiment, additional certificates can be combined into the combined certificate. For example, a third certificate could be combined into the combined certificate with a third name from the third certificate stored in the SubjectAltName extension of the combined certificate. Typically, the public key of the first certificate will be used as the public key of the combined certificate.

In this example of a combined certificate based on three original certificates, the combined certificate could be formed as part of an enrollment process in which all three names are submitted by the user prior to formation of the combined certificate. Alternatively, the combined certificate could be an updated certificate based on an initial combined certificate to which additional names (e.g., the third name) are added. Since the SubjectAltName extension provides for storage of multiple names, three or more certificates can be combined with the additional names stored in the SubjectAltName extension along with the second name. One of ordinary skill in the art would recognize many variations, modifications, and alternatives.

CAs implementing embodiments of the present invention will be able to offer users the ability to combine names from multiple certificates into one certificate. An advantage of such a combined certificate is that a single certificate and associated private key pair is easier to manage than multiple certificates and their associated private keys. The combined certificate can be used on any server whose name is in the certificate—the user doesn't have to keep track of which certificate belongs on which server. The user is able to determine which name is stored in the Subject field and which name(s) are stored in the SubjectAltName extension of the combined certificate. Thus, the applicant is provided with a significant level of control and convenience using embodiments of the present invention.

It should be appreciated that the specific steps illustrated in FIG. 2 provide a particular method of combining multiple digital certificates to form a combined digital certificate according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

As an alternative implementation of the method illustrated in FIG. 2, if the certificate selected by the user as the "master" certificate does not contain a name in the Subject field, but only a single SubjectAltName value (i.e., a single name in the SubjectAltName extension), the SubjectAltName value will be used to populate the Subject field of the combined certificate. As another alternative implementation, if any of the certificates selected for combination already contain multiple names stored in the SubjectAltName extension (e.g., the "master" or first certificate already contains multiple names stored in the SubjectAltName extension), one or more of these names can be added as names stored in the combined certificate. The user interface could, therefore, provide locations for entry of information related to the certificates and the names present in the certificate could be extracted and displayed for selection by the user. Once information on all the certificates to be combined is entered, the various names could be extracted and presented as a listing, enabling the user to select a name for inclusion in the Subject field with the remaining names stored in the SubjectAltName extension.

Figure 3:
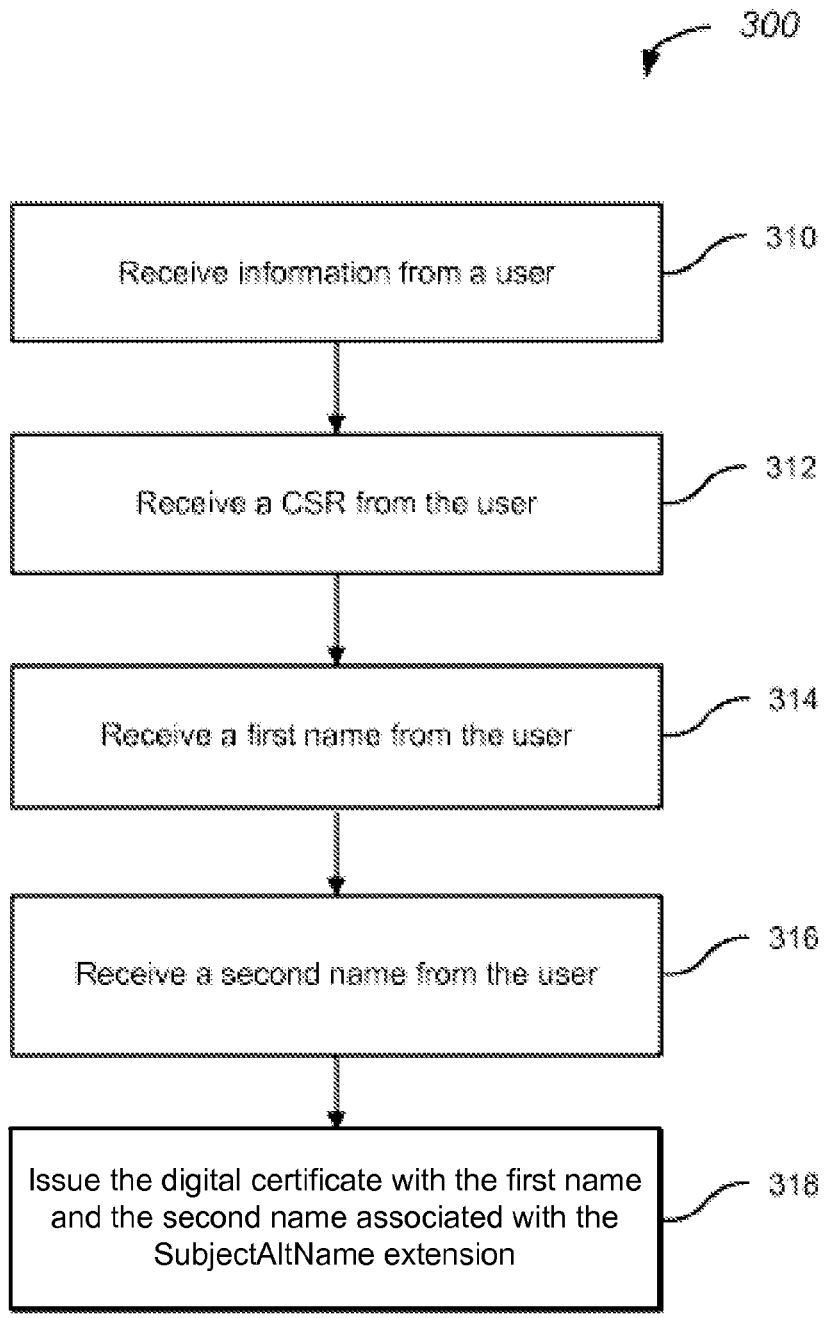
FIG. 3 is a simplified flowchart of a certificate provisioning process according to an embodiment of the present invention.

FIG. 3 is a simplified flowchart of a certificate provisioning process according to an embodiment of the present invention. The method 300 of forming a combined digital certificate includes receiving information from a user (310). The information typically includes contact information and billing information as discussed in relation to FIG. 1. The method also includes receiving a CSR for the combined digital certificate from the applicant/user (312). In this embodiment of provisioning a combined certificate from multiple certificates selected by the applicant, the applicant does not choose a "master" certificate. Rather, the user submits a new CSR to the CA and the CA takes the public key from the new CSR and uses this public key as the public key of the combined certificate. In this embodiment, after the applicant submits the CSR to provide the public key of the combined certificate, the applicant chooses a number of existing certificates from which all the names will be extracted and listed for the user to choose as described below.

The method also includes receiving a first name for use with the combined digital certificate (314) and receiving a second name for use with the combined digital certificate (316). The first name can be included in the CSR, for example, as the common name of the CSR. Additionally, the first name and/or the second name can be entered by a user through a suitable user interface. The combined digital certificate is then issued with the first name and the second name carried in the SubjectAltName extension of the combined digital certificate (318). In some embodiments, the first name or the second name is also carried in the common name of the Subject field of the combined certificate. In an embodiment, the user can provide information about a vendor of web server software, either through a data entry screen or by selecting from a list of vendors. Moreover, the user can enter a service period that will be associated with the combined digital certificate.

In the embodiment illustrated in FIG. 3, the user decides, by providing one name as a first name and another name as a second name, which name will be stored in the Subject field (e.g., as the common name) of the combined certificate. Other names associated with the combined digital certificate will be stored in the SubjectAltName extension.

It should be appreciated that the specific operations illustrated in FIG. 3 provide a particular method of performing a certificate provisioning process according to an embodiment of the present invention. Other sequences of operations may also be performed according to alternative embodiments. For example, alternative embodiments of the present invention may perform the operations outlined above in a different order. Moreover, the individual operations illustrated in FIG. 3 may include multiple sub-steps that may be performed in various sequences as appropriate to the individual step. Furthermore, additional steps may be added or removed depending on the particular applications.

Figure 4:
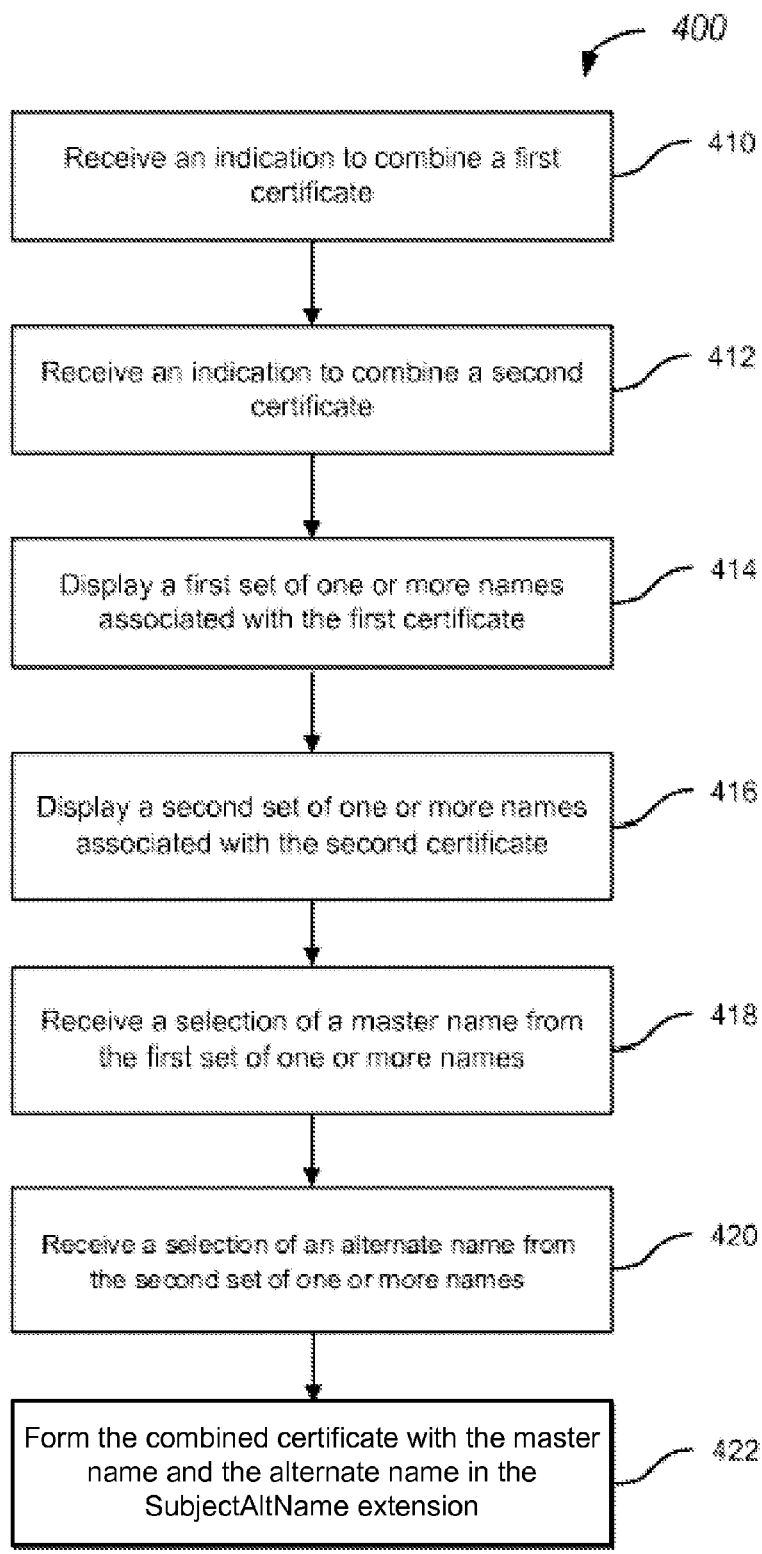
FIG. 4 is a simplified flowchart of a method of combining multiple digital certificates to form a combined digital certificate according to another embodiment of the present invention.

FIG. 4 is a simplified flowchart of a method of combining multiple digital certificates to form a combined digital certificate according to another embodiment of the present invention. In the embodiment illustrated in FIG. 4, the user indicates several certificates that are to be combined. The user is then presented with all the names carried in the Subject fields (e.g., the common names) of the various certificates and all of the names carried in the SubjectAltName extensions of the various certificates. Given the list of names, the user is able to choose the names that will be included in the combined certificate, and which of those names will appear in the Subject field, for example, as the common name.

The method of combining a plurality of digital certificates into a combined certificate 400 includes receiving an indication to combine a first certificate (410) and receiving an indication to combine a second certificate (412). The indication to combine the first and second certificates can be received by the user entering certificate information into a data entry screen, listing certificates in response to a query from the certificate combination system, or the like. Additionally, the user can indicate an intent to combine more than two certificates into the combined certificate, for example, three, four, or more certificates.

A first set of one or more names associated with the Subject field or the SubjectAltName extension of the first certificate is displayed (414). If the first certificate has a single name stored in the Subject field, this first set will consist of a single name. As an example, the name could be a domain name of a website. If one or more names are stored in the SubjectAltName extension (e.g., additional domain names for other websites), then these names will also be displayed as part of the first set. A second set of one or more names associated with the Subject field or the SubjectAltName extension of the second certificate is displayed (416). As with the first certificate, the various names stored in the second certificate will be displayed as the second set. If the user indicates an intent to combine a third certificate into the combined certificate, then a third set of one or more names carried in either the Subject field or the SubjectAltName extension of the third certificate will be displayed.

A selection of a master name from the first set of one or more names is received (418). Additionally, a selection of an alternate name from at least one of the first set of one or more names or the second set of one or more names is received (420). Thus, the alternate name can be selected from either the first set or the second set. The alternate name can be "selected" by default if there is only a single name in the first certificate and a single name in the second certificate. One of ordinary skill in the art would recognize many variations, modifications, and alternatives.

The combined certificate is formed with the master name and the alternate name in the SubjectAltName extension of the combined certificate (422). In some embodiments, the master name may be stored in the Subject field of the combined certificate instead of, or in addition to, being stored in the SubjectAltName extension. If a third certificate is combined into the combined certificate, then one or more names from the third set of one or more names can be stored in the SubjectAltName extension of the combined certificate. In an embodiment, the public key of the first certificate is used as the public key of the combined certificate. In other embodiments, the public key of the second certificate is used as the public key of the combined certificate. Thus, users have a great level of flexibility in defining the characteristics of the combined certificate. One of ordinary skill in the art would recognize many variations, modifications, and alternatives.

It should be appreciated that the specific steps illustrated in FIG. 4 provide a particular method of combining multiple digital certificates to form a combined digital certificate according to an embodiment of the present invention. Other sequences of steps may also be performed according to alternative embodiments. For example, alternative embodiments of the present invention may perform the operations outlined above in a different order. Moreover, the individual operations illustrated in FIG. 4 may include multiple sub-steps that may be performed in various sequences as appropriate to the individual step. Furthermore, additional operations may be added or removed depending on the particular applications.

Because embodiments of the present invention allow a CA to offer several different ways to choose the name carried in the Subject field and the public key used for the combined certificate, purchasers have a significant amount of flexibility in defining the components of the combined certificate.

Figure 5:
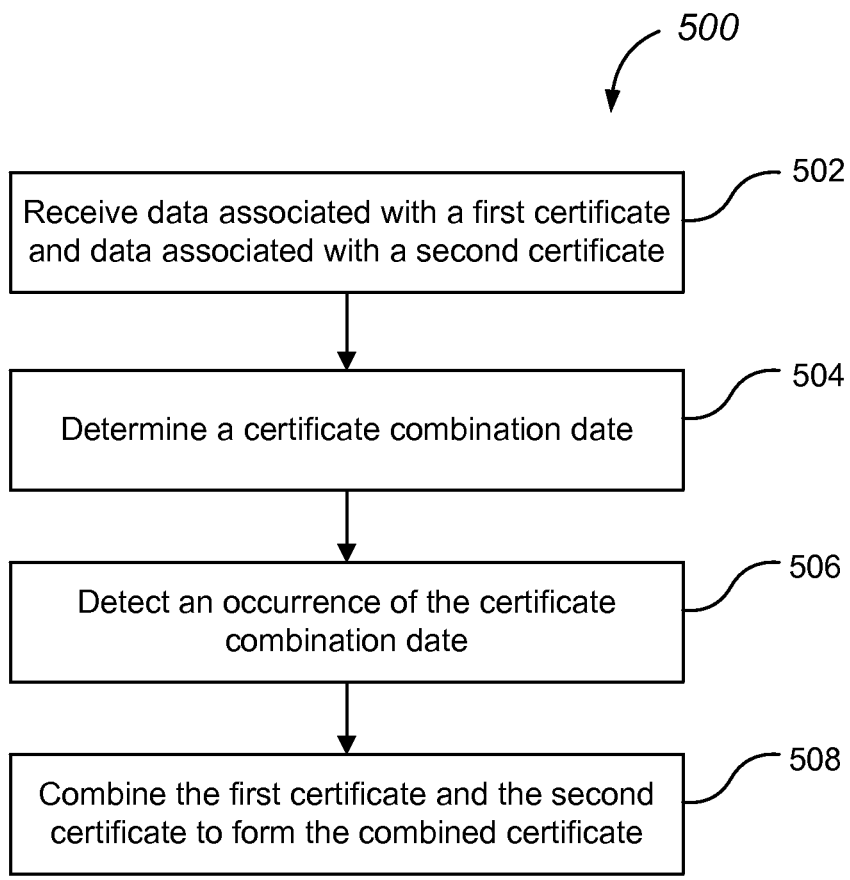
FIG. 5 is a simplified flowchart of a method of combining multiple digital certificates to form a combined digital certificate according to another embodiment of the present invention.

FIG. 5 is a simplified flowchart of a method 500 of combining multiple digital certificates to form a combined digital certificate according to another embodiment of the present invention. In the embodiment illustrated in FIG. 5, the user indicates two or more certificates that are to be combined at a certificate combination date. The user may then be presented with the names carried in the Subject fields (e.g., the common names) of the various certificates and the names carried in the SubjectAltName extensions of the various certificates and the expiration dates associated with the names in the certificates. Given the list of names, the user is able to choose the names, e.g. domain names, that will be included in the combined certificate, and which of those names will appear in the Subject field, for example, as the common name. In some embodiments of the method 500, and the other methods described herein, all of the names in the combined certificate are included in the SubjectAltName extension, and the common name is not used. In some other embodiments, the name included in the Subject field of the combined certificate is also included in the SubjectAltName extension. Similarly, the user is able to choose a date on which to combine the certificates. This date may include a calendar date, with values for a year, a month, and a day on which the certificate are to be combined and may further specify a time, i.e. hours, minutes, etc., as part of the date. Thus, the user may be able to take steps to combine two or more certificates well in advance of the time at which the certificates need to be combined. In some embodiments at least one of the two or more certificates may be a desired certificate, e.g. a "certificate" that is desired for future use, but that does not currently exist. For example, a user may want to add a name to an existing certificate. This may be done by combining a first existing certificate with a desired certificate that includes the name to be added to the existing certificate, thereby forming a combined certificate.

As illustrated, the method 500 includes several enumerated operations. Embodiments of the method 500 may include additional operations, before, after, or as part of the enumerated operations. Thus, the method 500 may begin with receiving data associated with a first certificate and with a second certificate (502). The data may be received as a user transmits or uploads the first and second certificates, and in some instances more certificates, to a certificate combining system. The data may be extracted to identify names, expiration dates, organization names, and other features of the certificates. Each of the first and second certificates includes at least one name, but may include many more than one name in some embodiments.

A certificate combination date is determined (504), the occurrence of which may automatically trigger the certificate combining system to combine the certificates. The certificate combination date may be selected by a user of the combining system through a user interface. In some embodiments, data extracted from the received first and second certificates, including expiration dates, may be presented to the user as options for the certificate combining date. The earliest expiration date may be automatically presented to the user as a default option, in order to avoid a lapse of the certificate. In some additional embodiments, the user may manually enter a desired certificate combination date that is not one of the expiration dates of the certificates to be combined.

Additionally, as discussed herein, the user may select which of the names extracted from the received certificates is to be used in the Subject field of the combined certificate, and also which names should be included as SubjectAltName extensions. Not all of the names extracted from the received certificates may be selected for inclusion in the combined certificate.

The certificate combining system records the certificate combining date and sets a timer or a similar mechanism to detect the occurrence or arrival of the determined certificate combination date (506), upon which the system responds by combining the received certificates according to the entered preferences of the user, to form a combined certificate (508), having the pre-selected or pre-determined name in the Subject field and the other selected names in the SubjectAltName extensions. In some embodiments, a public key of the first certificate is used as the public key of the combined certificate. The combined certificate may comply with RFC 5280.

In some embodiments, three or more certificates are selected by a user and combined to form a combined certificate. Each of these additional certificates may include a name in a Subject field and may further include more than one name in a SubjectAltName extension of the additional certificate. Data may be extracted from each of the additional certificates to present to a user for selection of domain names to include in the combined certificate and to present the expiration dates that may be used in determining the certificate combination date. The user may select each name desired for inclusion in the combined certificate and the certificate combination date through the certificate combining system.

Under some circumstances a user may want to remove a name from the combined certificate. Through the user interface the user may select each name to be removed and also specify a date on which the name removal is to occur. Thus, the user may be able to act in advance of anticipated changes in certificate needs and desires.

Additionally, the first and second certificates, and any other certificates selected for combining, may be combined on the certificate combination date into a wildcard certificate. A wildcard certificate is a certificate corresponding to a "*.domain-name.com," such that the wildcard certificate can be used with multiple subdomains such as "news.domain-name.com," "shop.domain-name.com," and the like. In some instances, subdomains may be acquired at different times, and a user may desire to consolidate the subdomains into a wildcard domain on a certain date, such as the expiration date of the first subdomain. The user may select multiple qualifying subdomain certificates for combination into a combined wildcard certificate on the certificate combination date. This may provide a significant cost savings for the user.

Figure 6:
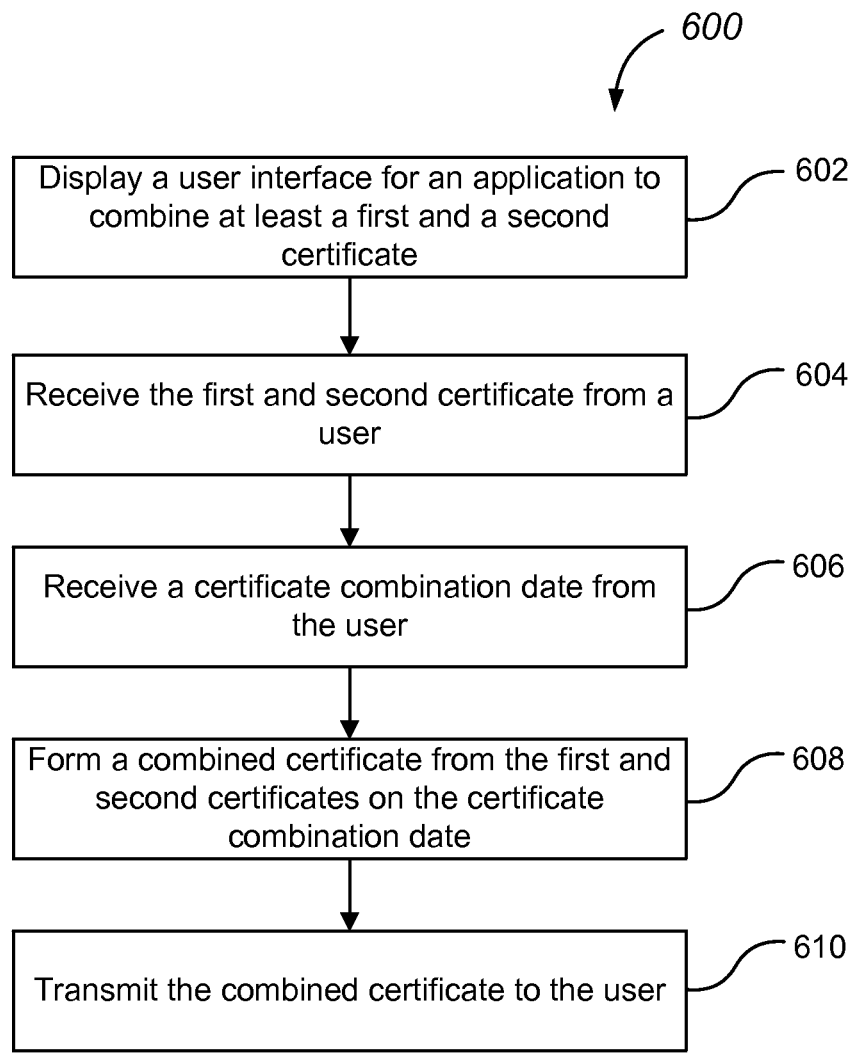
FIG. 6 is a simplified flowchart of a method of combining multiple digital certificates to form a combined digital certificate according to another embodiment of the present invention.
Figure 8:
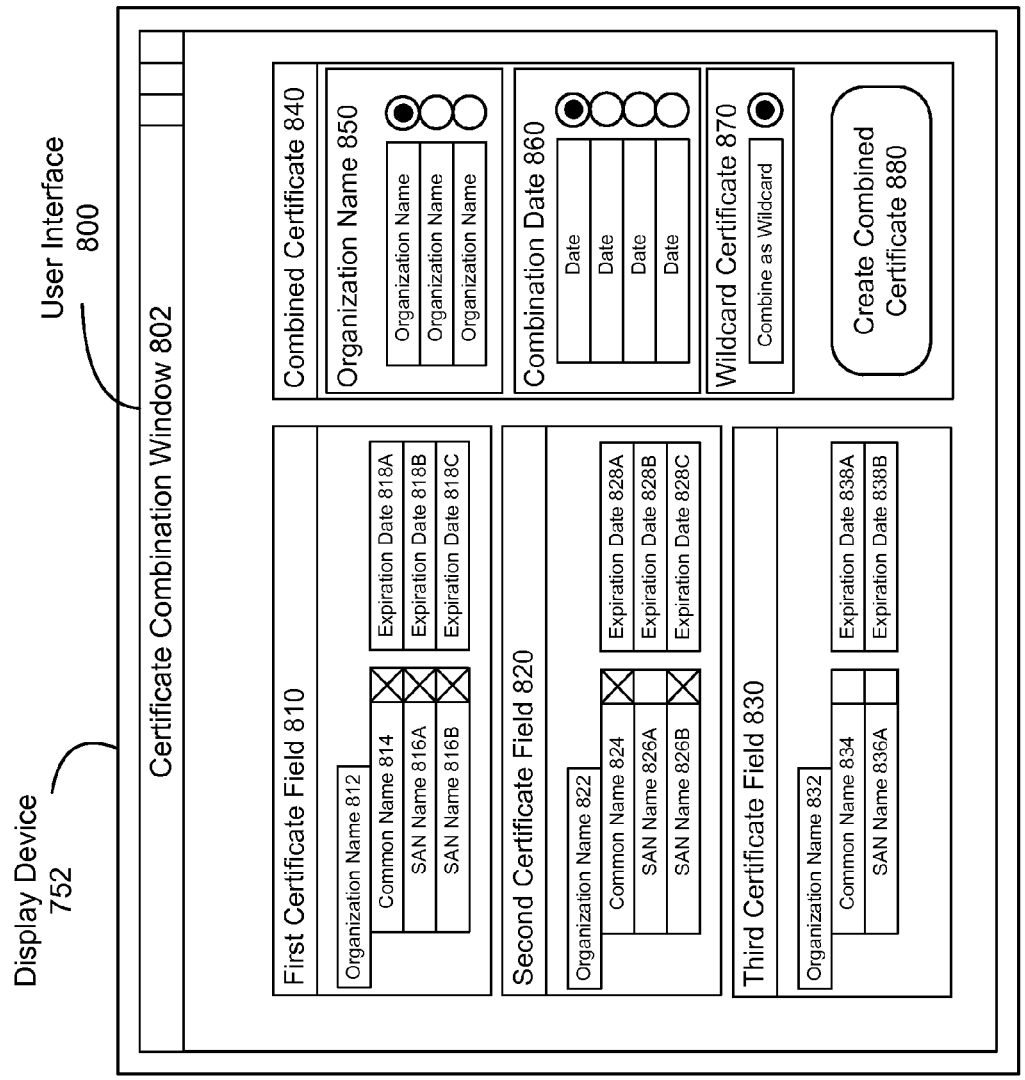
FIG. 8 illustrates an example user interface according to an embodiment of the present invention.

FIG. 6 is a simplified flowchart of a method 600 of providing a user interface for combining multiple digital certificates to form a combined digital certificate according to another embodiment of the present invention. The method 600 includes several enumerated operations as illustrated, but embodiments of the method 600 may include additional operations. As illustrated, in the method 600 a user interface (e.g., a user interface as illustrated in FIG. 8) for combining at least a first certificate and a second certificate is displayed to the user (602). This may be done through a web browser of a client computer used by the user to access an application running on a certificate combining server or a mobile application (mobile app) on the client computer. The server transmits a user interface document (e.g., a web page or a mobile app document) over a network to the client computer to present information to and solicit input from the user. In the embodiment illustrated in FIG. 6, the user indicates several certificates that are to be combined at a certificate combination date.

Through the user interface, the user provides at least the first and second certificates, which are sent by the client computer and received by the certificate combining system (604). Additionally, a certificate combination date is received (606) as part of method 600. When the certificate combination date occurs, and in response thereto, a combined certificate is formed, by the certificate combining server, from the first and second certificates (608). This combined certificate is subsequently transmitted, or otherwise made accessible, to the user (610).

In some embodiments of the method 600, a request is received from the user to combine at least the first and second certificates as a wildcard certificate as described herein. Expiration dates of at least the first and second certificates may be displayed to the user, to permit the user to select a desired certificate combination date. Additionally, an organization name from the first certificate and an organization name for the second certificate may be displayed to the user. Where the organization names are different, the user may be prompted to choose one of the existing organization names for use as the organization name in an organization field of the combined certificate. Alternatively, a new organization name may be entered by the user to be applied at the certificate combining date when the first and second certificates, and any other selected certificates, are combined.

When the combined certificate is received by the user, the user may install the certificate on desired servers manually. However, in some instances, the process of provisioning the certificates may be automated. For example, a certificate distribution system may be provided that allows certificate management agents running on a customer's servers to automatically communicate with the CA to obtain and install update certificates with an administrator of the customer's servers being required to manually install the certificates.

Figure 7:
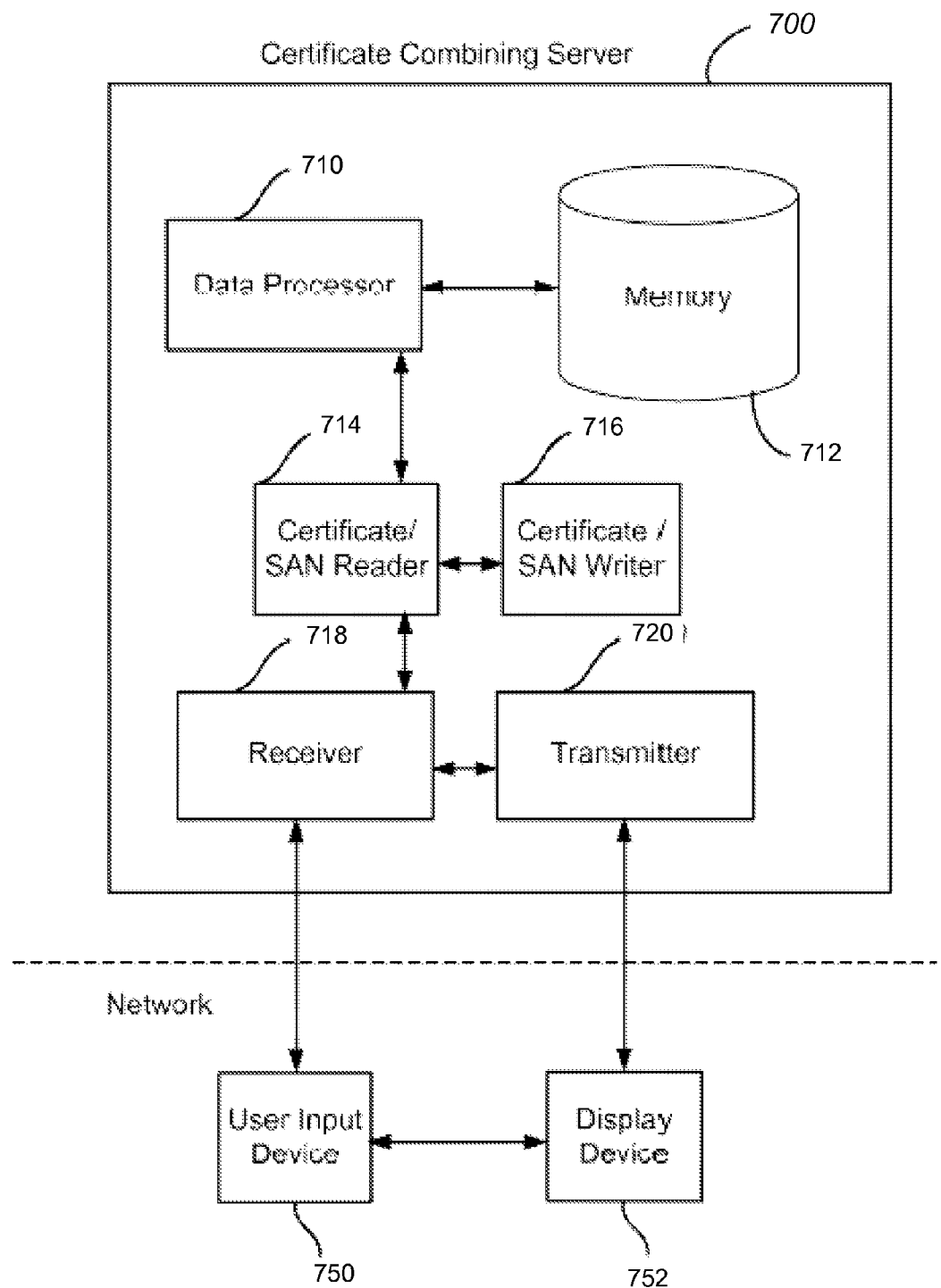
FIG. 7 is a simplified schematic diagram of a system for combining multiple digital certificates according to an embodiment of the present invention.

FIG. 7 is a simplified schematic diagram of a system for combining multiple digital certificates according to an embodiment of the present invention. The certificate combining server 700 includes a processor 710 (also referred to as a data processor) and a memory 712. The processor 710 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processor 710 is coupled to the memory 712 in order to store and access stored information for use during operation of the certificate combining server. The memory 712 (also referred to as a database or a computer readable medium) can be local or distributed as appropriate to the particular application. Memory 712 may include a number of memories including a main random access memory (RAM) for storage of instructions and data during program execution and a read only memory (ROM) in which fixed instructions are stored. Thus, memory 712 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The certificate combining server 700 also includes a receiver 718 and a transmitter 720. The receiver 718 and the transmitter 720 are operable to interact with a user input device 750 and a display device 752 over a network. The network can be the Internet or other network suitable for the communication of data and commands. Thus, a user is able, through a user interface interacting with the user input device 750 and the display device 752 to submit certificates for combination, indicate a name to be used as a "master" name for the combined certificate, submit CSRs, select names to be included in the SubjectAltName extension of the combined certificate, enter or select a certificate combination date, select an organization name, request to combine certificates as a wildcard, and other functions described throughout the specification. The user input device 750 and the display device 752 can be components of a personal computer, a web application, or the like. Typically, the user will interact with the certificate combining server 700 using one or more graphical user interfaces (GUIs) receiving input through user input device 750 and displaying output through display device 752.

The certificate combining server 700 also includes a certificate reader 714 and a certificate writer 716. The certificate reader 714 is used to parse the certificate and extract information used in provisioning of certificates. As examples, the certificate reader 714 is used to determine one or more names stored in a certificate for use in displaying such names as discussed in relation to step 414 illustrated in FIG. 4 and to determine expiration dates stored in the certificates to facilitate the user in selecting a desired certificate combination date as discussed in connection with methods 500 and 600 of FIGS. 5 and 6, respectively. The certificate writer 716 is used to provision the new combined certificate as discussed in relation to step 422 illustrated in FIG. 4 as well as other provisioning methods described herein and illustrated in FIGS. 1-6. The processor 710 may monitor an onboard clock or set a timer to detect the occurrence of a certificate combination date and, in response, instruct the certificate writer 716 to combine certificates according to information, including certificate data and user-selections, stored in memory 712.

The certificate combining server 700 may create a user interface document (e.g., a web page or a mobile app UI document) that can be sent to a client computer and rendered on a display device of the client computer.

FIG. 8 illustrates an example user interface 800 displayed on display device 752 of the client computer. The user interface 800 may receive information from the user through a certificate reader operating on the client computer. The user interface 800 may provide a certificate combination window 802. The window 802 may include a field for each certificate provided by the user for combination or merger. Thus, as illustrated, the window 802 of the user interface 800 includes a first certificate field 810, a second certificate field 820, and a third certificate field 830. The certificates 810, 820, and 830, and others may be provisioned by a CA other than the CA that provides the user interface 800. However, some or all of the certificates may be available automatically to the user if the certificates were obtained from the CA that operates the certificate combining server 700. In some embodiments, the user interface 800 may present a desired certificate as an existing certificate. For example, a user may currently use the certificates listed in certificate fields 810 and 820, while the certificate listed in the certificate field 830 is a desired certificate with a common name 834 and/or a SAN name 836A, neither of which is currently in use. The user may have plans to begin using domains with those names and thus desires a certificate for them. However, the desired certificate may not be required for a period of time. Thus, the user interface 800 may permit the scheduled inclusion of domain names that are not currently used into a combined certificate at a prescheduled time.

In the depicted embodiment, each of the certificate fields 810, 820, and 830 includes information extracted by the certificate reader from certificates specified by the user (e.g., by providing the name of the file containing a respective certificate) that are present in the CA's data storage or are uploaded by the user. In instances in which the user interface 800 permits the uploading of certificates by the user, such certificate may or may not have been issued by the CA. Each certificate includes an organization name, a common name, one or more SubjectAltName extension names (SAN names). Additionally, each of the names included in each of the certificates is associated with an expiration date. As illustrated, the common name 814 of the first certificate has an expiration date 818A, as do the SAN names 816A and 816B.

The certificates to combine can be selected in each certificate field. Some or all of the names, common names and SAN names, in each certificate may be selected. As illustrated in FIG. 8, the common name 814 and the SAN names 816A and 816B of the first certificate are selected and the common name 824 and the SAN name 826B are also selected to be combined.

The window 802 also provides a combined certificate field 840 that includes subfields providing for the selection of an organization name, a certificate combination date, and to combine the certificates as a wildcard, when possible. As an example, a user may select a first certificate having information as seen in the first certificate field 810 and a second certificate having information as seen in the second certificate field 820. Supposing the organization name 812 and 822 are different, both names may appear as options in the organization name field 850. Only one of the organization name options may be selected within the organization name field 850 for use in the combined certificate. As another example, the expiration dates 818A-C may all be Jan. 1, 2015, and the expiration dates 828A-C are Nov. 1, 2014. The user interface 800 may provide all of the expiration dates as certificate combination date options in the combination date field 860. The earliest of the expiration dates, in this example Nov. 1, 2014, may be selected automatically by the certificate combining server 700. In other embodiments, a field or other user input component may allow for the manual entry of a desired certification combination date.

In some embodiments, the common name and/or SAN names of a certificate may be combined in a single combined certificate at different times. For example, the user interface 800 may permit a user to select common name 824 and SAN name 826A with the names of the first certificate field 810 on a first date, and then merge-in the SAN name 826B on a later second date, such as a month later. Thus, the SAN name 826B is merged or combined into a certificate that has already undergone one combining operation. User may select the SAN name 836A for inclusion at an even later third date. The certificate combination window 802 may provide for an anticipated view of any existing certificates or those scheduled for creation. For example, the user may use the user interface 800 to view the scheduled status of the certificates in certificate fields 810, 820, and 830 at a time after Nov. 1, 2014, such that the results of the scheduled combination will be displayed as they will have occurred after that date.

In some embodiments, each of the common names and SAN names presented the certificate fields 810, 820, or 820 may be presented with a combination date field in which a combination date for that name may be manually entered or selected through a date selection feature. Thus a plurality of different combination dates may be selected, such that some names are to be combined in a single combined certificate on an earlier first date and some names are to be combined in the single combined certificate on a later second date. After a combination date is entered for each name (common name or SAN name) to be combined, the user may request the combined certificate using the Create Combined Certificate button 880. The combined certificate will be formed at the earlier first date and then added to on the later second date as specified by the user.

Additionally, a wildcard certificate field 870 may allow a user to combine selected certificates as a wildcard certificate if the common names and SAN names are domain names that are combinable as a wildcard certificate. When the user of the user interface 800 is satisfied with the options selected in the organization name field 850, the combination date field 860, and the wildcard certificate field 870, the user may make a request for such a combined certificate using the Create Combined Certificate button 880.

Other user interface components, buttons, text entry fields, radio buttons, etc., may be used in embodiments of the user interface 800. Such variations are within the scope and spirit of the present disclosure. After a combined certificate is created using the user interface 800, a user may be able to schedule a future combination in which the combined certificate is combined with another certificate. The combinations may be automatically performed by the certificate combining server 700 accord to the methods illustrated in FIGS. 1-6 and described herein. This may allow for anticipatory management of certificates and for the consolidation of certificates into wildcard certificates that may simplify certificate management.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   receiving, by at least one hardware processor, data from a first certificate and data from a second certificate;
   determining, by the hardware processor, a certificate combination date, the certificate combination date directing a combining of the first certificate and the second certificate to form a combined certificate;
   detecting, by the hardware processor, an occurrence of the certificate combination date; and
   combining, by the hardware processor, the first certificate and the second certificate to form the combined certificate in response to detecting the occurrence of the certificate combination date.

2. The method of claim 1, wherein the data from the first certificate comprises an expiration date of the first certificate and the data from the second certificate comprises an expiration date of the second certificate, and wherein the certificate combination date is the expiration date of the first certificate or the expiration date of the second certificate.

3. The method of claim 2, wherein the certificate combination date is the expiration date of the first certificate when the expiration date of the first certificate is earlier than the expiration date of the second certificate.

4. The method of claim 1, wherein the data from the first certificate comprises a first name from a Subject field or a SubjectAltName extension of the first certificate and the data from the second certificate comprises a second name from a Subject field or a SubjectAltName extension of the second certificate, and wherein the combined certificate comprises the first name and the second name in a SubjectAltName extension of the combined certificate.

5. The method of claim 4, further comprising:
   receiving an indication to combine a third name from a Subject field or a SubjectAltName extension of a third certificate with the combined certificate; and
   updating the combined certificate to also store the third name in the SubjectAltName extension of the combined certificate.

6. The method of claim 4, further comprising receiving a request to combine the first name from the first certificate and the second name from the second certificate into the combined certificate on the certificate combination date.

7. The method of claim 4, wherein the data from the second certificate further comprises a third name from the Subject field or the SubjectAltName extension of the second certificate, wherein the combined certificate comprises the third name in the SubjectAltName extension of the combined certificate, and further comprising:
   determining a name removal date; and
   removing the third name from the combined certificate in response to an occurrence of the name removal date.

8. The method of claim 1, wherein a public key of the combined certificate comprises a public key of the first certificate.

9. The method of claim 1, wherein the combined certificate complies with RFC 5280.

10. The method of claim 4, wherein the first name comprises a first domain name and the second name comprises a second domain name.

11. The method of claim 1, further comprising:
    providing, for display on a display device, a first set of names from a Subject field or a SubjectAltName extension of the first certificate and a second set of names from a Subject field or a SubjectAltName extension of the second certificate; and
    receiving a primary selection of a first name from the first set of names and an alternate selection of at least a second name from the second set of names.

12. A non-transitory machine-readable storage medium including data that, when executed by at least one hardware processor, cause the hardware processor to perform operations comprising:
    providing a user interface for combining at least a first certificate and a second certificate;
    receiving the first certificate and the second certificate from a user of the user interface;
    receiving a certificate combination date from the user of the user interface; and
    forming, by the hardware processor, a combined certificate from the first certificate and the second certificate by the certificate combination date; and
    transmitting the combined certificate to the user over a network on the certificate combination date.

13. The non-transitory machine-readable storage medium of claim 12, wherein the combined certificate comprises a first name for a first domain from the first certificate, a second name for a second domain from the second certificate, and a third name that is not from the first certificate or from the second certificate.

14. The non-transitory machine-readable storage medium of claim 12, further comprising:
    receiving a request from the user to form a wildcard certificate from the first certificate and the second certificate.

15. The non-transitory machine-readable storage medium of claim 12, further comprising:
    providing, for display in the user interface, a first expiration date of the first certificate and a second expiration date of the second certificate; and
    wherein receiving the certificate combination date from the user comprises receiving a selection from the user of one of the first expiration date and the second expiration date as the certificate combination date.

16. The non-transitory machine-readable storage medium of claim 12, further comprising:
    providing, for display in the user interface, a first organization name from the first certificate and a second organization name from the second certificate; and
    receiving a selection from the user of one of the first organization name and the second organization name for inclusion in the combined certificate as a combined certificate organization name; and
    wherein forming the combined certificate comprises including the selected organization name in an Organization Name field of the combined certificate.

17. A system comprising:
    at least one memory that stores certificate information comprising certificates or information extracted from certificates; and
    at least one hardware processor to communicate with the memory to:
       provide a user interface for receiving user input specifying at least a first certificate and a second certificate, and user input specifying a certificate combination date;
       form a combined certificate from the first certificate and the second certificate by the certificate combination date; and
    transmit the combined certificate to a user over a network on the certificate combination date.

18. The system of claim 17, wherein the certificate combination date comprises a year value, a month value, and a day value.

19. The system of claim 17, wherein the combined certificate is a wildcard certificate.

\* \* \* \* \*